United States Patent
Zhang et al.

(10) Patent No.: US 8,098,584 B2
(45) Date of Patent: Jan. 17, 2012

(54) OPTIMIZATION OF TRAFFIC ROUTING FOR DATA CENTER SERVICES

(75) Inventors: Ming Zhang, Redmond, WA (US);
Albert Greenberg, Seattle, WA (US);
Ratul Mahajan, Seattle, WA (US);
Blaine S. Christian, Woodinville, WA (US); Zheng Zhang, West Lafayette, IN (US)

(73) Assignee: Microsoft Corporation, Redmond, WA (US)

( * ) Notice: Subject to any disclaimer, the term of this patent is extended or adjusted under 35 U.S.C. 154(b) by 204 days.

(21) Appl. No.: 12/537,479

(22) Filed: Aug. 7, 2009

(65) Prior Publication Data
US 2011/0032833 A1 Feb. 10, 2011

(51) Int. Cl.
*G01R 31/08* (2006.01)
*H04L 12/28* (2006.01)
(52) U.S. Cl. ............. 370/238; 370/252; 370/395.2; 370/401
(58) Field of Classification Search .............. None
See application file for complete search history.

(56) References Cited

U.S. PATENT DOCUMENTS

| | | | |
|---|---|---|---|
| 5,463,686 A | 10/1995 | Lebourges | |
| 6,683,945 B1 | 1/2004 | Enzmann et al. | |
| 6,981,055 B1* | 12/2005 | Ahuja et al. | 709/238 |
| 7,006,448 B1 | 2/2006 | Thio | |
| 7,085,837 B2 | 8/2006 | Kimbrel et al. | |
| 2002/0042812 A1* | 4/2002 | Spencer | 709/203 |
| 2003/0133443 A1* | 7/2003 | Klinker et al. | 370/353 |
| 2004/0042402 A1* | 3/2004 | Galand et al. | 370/237 |
| 2010/0172249 A1* | 7/2010 | Liu | 370/252 |

OTHER PUBLICATIONS

Agarwal, et al., "Measuring the Shared Fate of IGP Engineering and Interdomain Traffic", Proceedings 13th IEEE Intl Conf on Network Protocols, 2005, retrieved from the internet at http://www.ieee-icnp.org/2005/Papers/21_sagarwal-Interdomain.pdf, 10 pgs.
Akella, et al., "A Comparison of Overlay Routing and Multihoming Route Control", SIGCOMM'04, Aug. 30-Sep. 3, 2004, Portland, OR, retrieved from the internet at http://conferences.sigcomm.org/sigcomm/2004/papers/p397-akella1.pdf, 14 pgs.
Akella, et al., "A Measurement-Based Analysis of Multihoming", SIGCOMM'03, Aug. 2003, retrieved from the internet at http://www.cs.princeton.edu/~jrex/teaching/spring2005/reading/akella03.pdf, pp. 353-364.

(Continued)

*Primary Examiner* — Kwang B Yao
*Assistant Examiner* — Jutai Kao
(74) *Attorney, Agent, or Firm* — Lee & Hayes, PLLC (57) ABSTRACT

Techniques and systems for providing optimization of traffic routing for data centers are disclosed herein. In some embodiments, a method may include identifying a plurality of available source sites and paths or routes between an online service provider (OSP) and a destination prefix. A traffic manager may measure a cost for each of the plurality of available paths. In some instances, the traffic manager may also measure a performance value for each of the available paths. The traffic manager may then select one of the available source sites and paths as a preferred source site and path that has a minimized cost for an instance of the performance value when compared to other paths of the plurality of available source sites and paths. In further embodiments, the traffic manager may rewrite a routing table and DNS mapping to implement the preferred source site and path as the default source site and path between the OSP and the destination prefix.

15 Claims, 6 Drawing Sheets

OTHER PUBLICATIONS

Akella, et al., "Multihoming Performance Benefits: An Experimental Evaluation of Practical Enterprise Strategies", USENIX Annual Technical Conf 2004, Boston, MA, retrieved from the internet at http://www.cs.cmu.edu/~aditya/papers/usenix04.pdf, 14 pgs.

Dhamdhere, et al., "ISP and Egress Path Selection for Multihomed Networks", IEEE 2006, retrieved from the internet at http://ieeexplore.ieee.org/stamp/stamp.jsp?tp=&isnumber=&arnumber=4146933, 12 pgs.

Goldenberg, et al., "Optimizing Cost and Performance for Multihoming", SIGCOMM'04, Aug. 30-Sep. 3, 2004, Portland, OR, retrieved from the internet at http://www.cs.princeton.edu/~jrex/teaching/spring2005/reading/goldenberg04.pdf, 14 pgs.

He, et al., "Toward Internet-Wide Multipath Routing", IEEE Network, Mar./Apr. 2008, retrieved from the internet at http://ieeexplore.ieee.org/stamp/stamp.jsp?arnumber=04476066, pp. 16-21.

Kallitsis, et al., "Pricing and Measurement-based Optimal Resource Allocation in Next Generation Network Services", Globecom Workshops, Nov. 2007 IEEE, retrieved from the internet at http://ieeexplore.ieee.org/stamp/stamp.jsp?tp=&isnumber=4437775&arnumber=4437788, 6 pgs.

Kandula, et al., "Walking the Tightrope: Responsive Yet Stable Traffic Engineering", SIGCOMM'05, Aug. 21-26, 2005, Philadelphia, PA, retrieved from the internet at http://nms.lcs.mit.edu/papers/sigcomm05_kandula.pdf, 12 pgs.

Katho, et al., "The Concept and Model of 4 Dimensional Traffic Engineering", 2006 IEEE, retrieved from the internet at http://ieeexplore.ieee.org/Xplore/login.jsp?url=http%3A%2F%2Fieeexplore.ieee.org%2Fiel5%2F11125%2F35640%2F01690501.pdf%3Ftp%3D%26isnumber%3D%26arnumber%3D1690501&authDecision=-203, 6 pgs.

Liu, et al, "Multihoming Route Control among a Group of Multihomed Stub Networks", Computer Communications, vol. 30, Issue 17, Nov. 2007, retrieved from the internet at http://dropzone.tamu.edu/techpubs/2006/TAMU-ECE-2006-01.ps, 12 pgs.

Liu, et al., "Route Optimization among a Group of Multihomed Stub Networks", IEEE Globecom 2005, retrieved from the internet at http://ieeexplore.ieee.org/stamp/stamp.jsp?arnumber=01577766, pp. 889-893.

"Open IP Networks for Innovation and Profit", Juniper Networks, Feb. 2009, retrieved from the internet at http://www.juniper.net/us/en/local/pdf/whitepapers/2000298-en.pdf, 13 pgs.

Verkaik, et al., "Wresting Control from BGP: Scalable Fine-grained Route Control", USENIX Annual Technicval Conf Jun. 2007, retrieved from the internet at http://cseweb.ucsd.edu/~snoeren/papers/rcp-usenix07.pdf, 14 pgs.

Wang, et al, "COPE: Traffic Engineering in Dynamic Networks", SIGCOMM'06, Sep. 11-15, 2006, Pisa, Italy, retrieved from the internet at http://delivery.acm.org/10.1145/1160000/1159926/p99-wang.pdf?key1=1159926&key2=9110285421&coll=GUIDE&dl=GUIDE&CFID=41118936&CFTOKEN=59385253, pp. 99-110.

Xie, et al., "P4P: Provider Portal for Applications", SIGCOMM'08, Aug. 17-22, 2008, Seattle, WA, retrieved from the internet at http://cs-www.cs.yale.edu/homes/yry/projects/p4p/p4p-sigcomm08.pdf, 12 pgs.

Zhang, et al., "On Optimal Routing with Multiple Traffic Matrices", 2005 IEEE, retrieved from the internet at http://ieeexplore.ieee.org/stamp/stamp.jsp?tp=&isnumber=&arnumber=1497927, pp. 607-618.

Zhang, et al., "Optimal Routing with Mutliple Traffic Matrices Tradeoff between Average and Worst Case Performance", Proceedings of the 13th IEEE International Conference on Network Protocols (ICNP'05), 2005, retrieved from the internet at http://ieeexplore.ieee.org/stamp/stamp.jsp?tp=&isnumber=32971&arnumber=1544622, 10 pgs.

\* cited by examiner

OPTIMIZATION OF TRAFFIC ROUTING FOR DATA CENTER SERVICES

BACKGROUND

When a person accesses data on the Internet, that person's computer sends a data request to an online service provider (OSP). To reach the OSP, the data request typically travels through several systems that are connected at various geographic points by routers and switches. Although there may be many different paths that connect the user's computer to the OSP, typically a default path and sourcing point is established for the connection. The default path and sourcing point have cost and performance characteristics associated with the transport of data between the user's computer and the OSP. In some instances, the default path and sourcing point is selected by a human.

To satisfy global user demand, Internet services run on multiple geographically distributed data centers that are managed by a global foundation service (GFS) team. The data centers support high volumes of traffic to facilitate responding to many end user requests for data. The GFS typically experiences large costs to transport data across the wide area network between data centers and the Internet at peering sites. At peering sites, an OSP network connects with multiple internet service providers (ISPs) to route traffic to the end users. The GFS has peering across multiple sites and backbone links that interconnect the GFS data centers. Typically, the GFS network has hundreds or more connections to neighbor ISPs. Hence, there is a high degree of available routes (paths) and sourcing locations that may be candidates for routing the data between the user's computer and the OSP. This means the GFS also has the flexibility to source traffic from multiple data centers around the globe.

SUMMARY

Techniques and systems for providing optimization of traffic routing for data centers are disclosed herein. An illustrative technique may identify a plurality of available paths and source locations between an online service provider (OSP) and a destination prefix, and a traffic manager may measure a cost for each of the plurality of available paths and/or sources. In some instances, the traffic manager may also measure a performance for each of the available paths.

In some aspects, the cost is measured as a fee associated with a transmission of data, which is extracted based on a volume of data transfer through network systems such as routers and switches. Performance may be measured as a round trip time of data transfer for the available path, throughput, or packet loss. Each available path may be represented on a chart based on the cost and performance value. An optimization curve may be identified on the chart to indicate optimized combinations of cost and performance.

The traffic manager may then select one, or multiple, available paths as preferred with a minimized cost for an instance of the performance value when compared to others of the plurality of available paths. For example, the preferred path or source may be selected from an available set of paths and sources along the optimization curve. In further embodiments, the traffic manager may rewrite a routing table or change a DNS response to implement the preferred path or source as the default path or source location between the OSP and the destination prefix.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

As discussed above, the global foundation service (GFS) team manages traffic between online service providers (OSPs), hosted by multiple data centers (DCs), and end users. A path used to transmit this traffic may be selected to reduce one or both of latency (i.e., increase performance and cost associated with the data transfer. Informed path selection may be conducted by quantifying costs of each possible path or source location between the OSP and the end user and measuring a round trip time (RTT) for each path to quantify latency. An optimization process may be used to automatically select a preferred (optimal) path or source based on the measured costs and the RTT.

The process and systems described herein may be implemented in a number of ways. Example implementations are provided below with reference to the following figures.

Illustrative Environment

Figure 1:
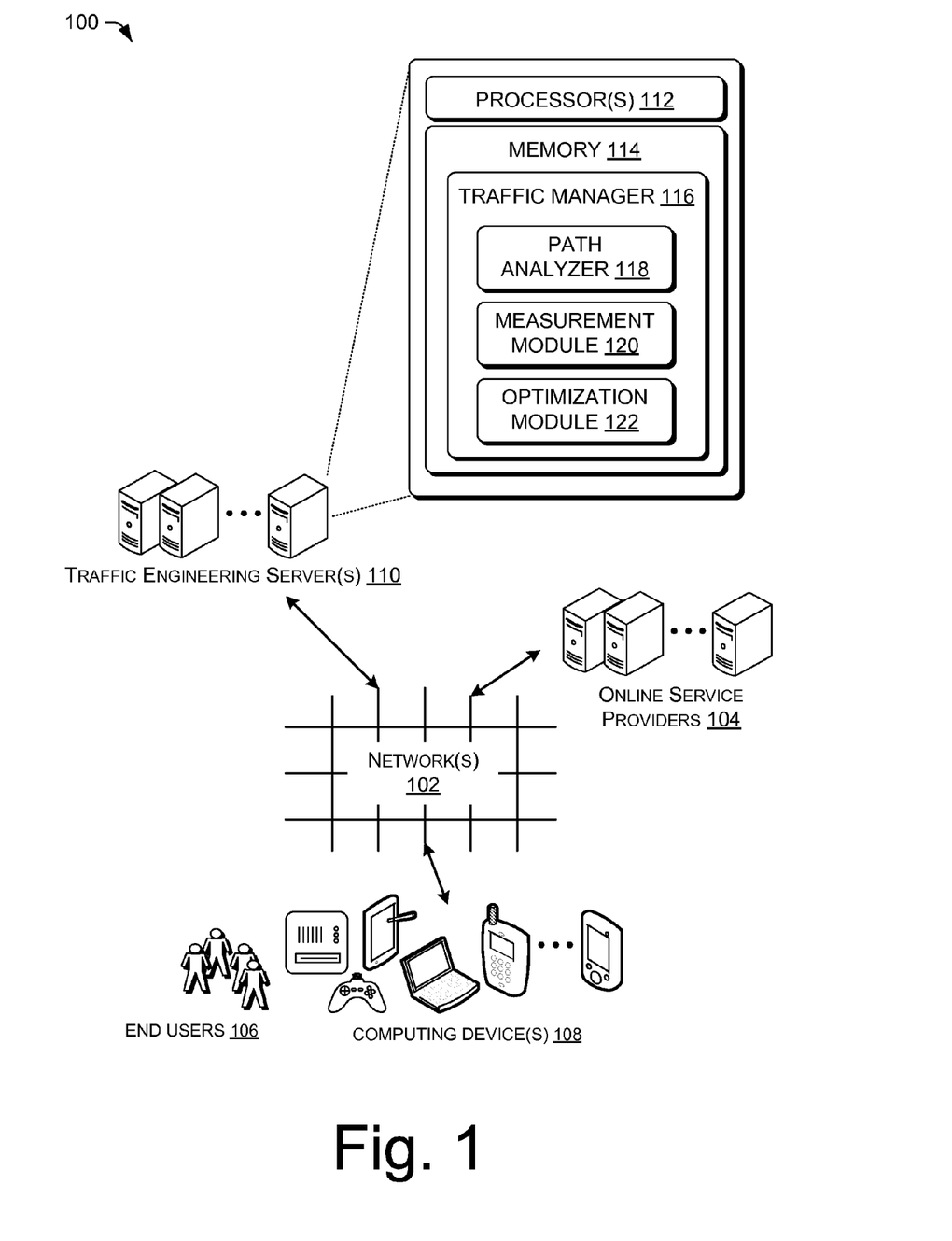
FIG. 1 is a schematic diagram of an illustrative environment where a server analyzes a network that connects a client device to an online service provider (OSP).

FIG. 1 is a schematic diagram of an illustrative environment 100 that includes a network 102 that facilitates communications between various computing resources. The network 102 may be the Internet, or in some instances, a smaller network having multiple routers that enable path selection between endpoints of a data communication.

The environment 100 includes online service providers (OSPs) 104 that provide data to end users 106 (or simply "users") having computing devices 108. The OSPs 104 may include search engines, e-commerce websites, social networking sites, news or entertainment sites, or anything else that provides online data for consumption by users 106. The OSPs 104 may receive requests for data each day, sometimes ranging upwards of millions of requests. Each request may be fulfilled in as efficient a manner as possible to satisfy the requests of the users 106.

The OSPs 104 may be hosted on many different DCs, which may be distributed across a large geography or the globe. One reason OSPs 104 may use multiple DCs is to place the DCs closer to the end users 106 to minimize latency in fulfillment of data requests. DCs are often located near large populations (e.g., large urban areas) for this reason. In addition, a site selection of a DC often takes into consideration locations where resources (energy) are relatively cheaper than other locations. Because of deployment of multiple DCs for an OSP, requests may be fulfilled from different locations. For example, in the United States, a first DC may be located near the west coast in California while a second DC may be located near the east coast in Virginia. Although a user in Arizona may be able to receive data from either the first or second DC, geographic proximity may identify the west coast DC as a cheaper and faster access point based purely off of proximity between the DC and the end user. However, geographic proximity may not be a clear indicator for an end user located in Chicago, thus routing decisions may be analyzed to determine one or more optimal paths to provide data from the OSPs (having multiple DCs) to the end user.

The users 106 may connect with the online service provider via the computing device 108. The computing device 108 may be a server, a desktop computer, a tablet, a mobile computer, a mobile telephone, a gaming console, or a music player, among other possible computing devices. When the user 106 submits a request for data using any one of the computing devices 108, the request is transmitted through the network 102 and typically routed by one or more internet service providers (ISPs) through multiple routers from a local (relative to the end user 106) routing hub to an edge router, core router, or the like, and eventually to a DC where the data that is requested may be accessed to fulfill the user request.

In accordance with various embodiments, traffic engineering server(s) (or simply "TE server") 110 may observe and interact with the network 102. For example, the TE server 110 may analyze data communications across the network 102 to determine one or more optimal paths for transmitting data between a particular one of the OSPs 104 and the user 106 via the computing device 108. More specifically, the TE server 110 may exchange data with various routers (core, edge, nexthub, etc.) that transmit data across various paths using different ISPs, and the like, to analyze possible paths for data transmission. The TE server 110 may modify routing tables for testing and measurement purposes and then output one or more optimum routing tables based on an analysis, which is further described below.

In a very basic configuration, TE server 110 may include one or more processors ("processors") 112 and system memory 114. Depending on the exact configuration and type of computing device 108, system memory 114 may be volatile (such as RAM), non-volatile (such as ROM, flash memory, etc.) or some combination of the two. System memory 114 may include a traffic manager 116 to perform the functions described herein.

In various embodiments, the traffic manager 116 may include a path analyzer 118 to determine available paths between one of the OSPs 104 (via one or more DCs) and the end user 106 (via the computing device 108).

In some embodiments, the traffic manager 116 may include a measurement module 120. The measurement module 120 may be used to measure the cost and performance of various paths between respective ones of the OSPs 104 and respective ones of the computing devices 108. For example, the measurement module 120 may identify possible paths and then measure traffic along these paths to determine a cost (usage fee) and round trip time (RTT) (i.e., latency measurement) of data transmission using a particular path. The measurement module 120 may then output measured values to the optimization module 122 for further processing.

In accordance with various embodiments, the traffic manager 116 may include the optimization module 122. The optimization module 122 may receive the measured values from the measurement module 120. The optimization module may determine a relationship between cost and latency (using the RTT) to enable an optimized selection of paths for routing data between one of the OSPs 104 and the computing device 108. In some embodiments, the optimization module 122 may identify a turning point that represents a path which is an ideal path for providing data the transfer at both a relatively low cost and low latency.

Illustrative Operation

Figure 2:
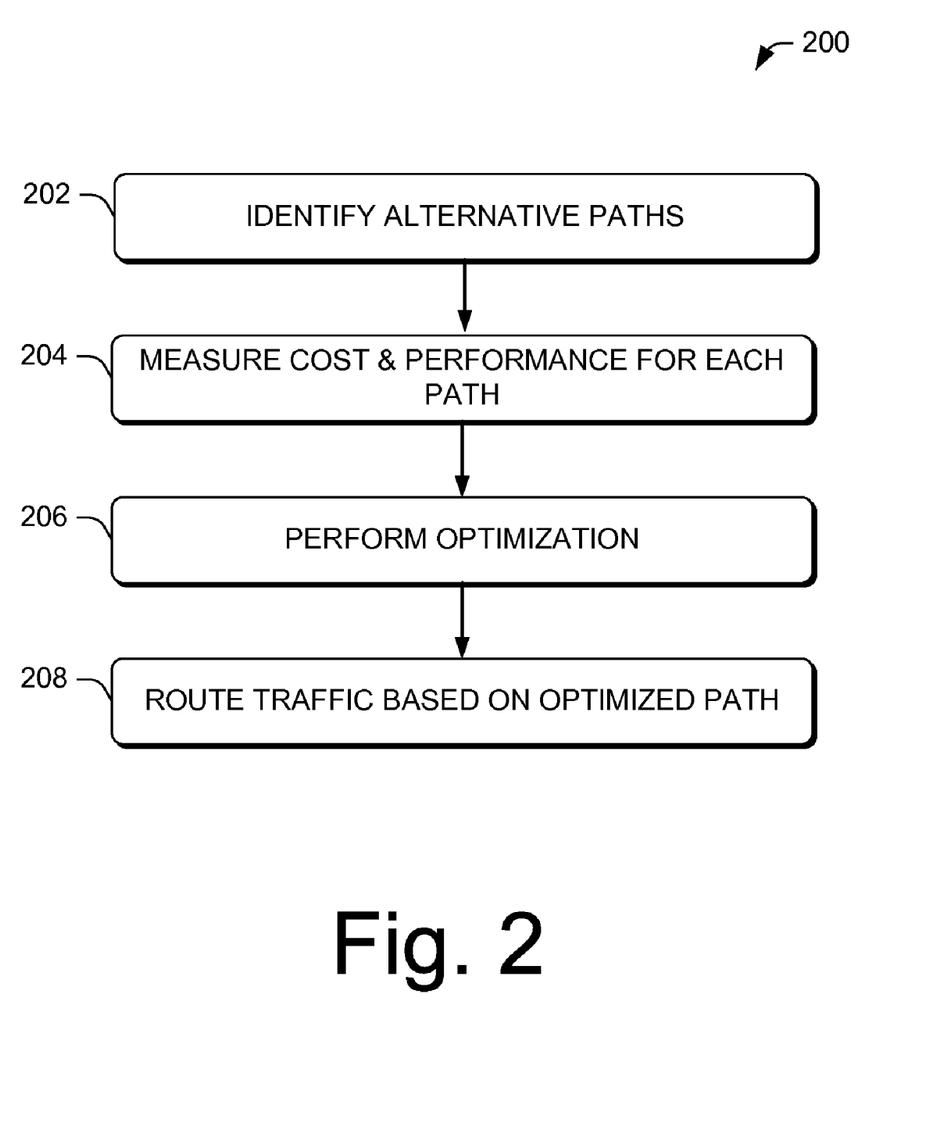
FIG. 2 is a flow diagram of an illustrative process of optimizing traffic routing for the OSPs.

FIG. 2 is a flow diagram of an illustrative process of optimizing traffic routing for the OSPs. The process 200 is illustrated as a collection of blocks in a logical flow graph, which represents a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 200, shall be interpreted accordingly.

At 202, the TE server 110, via the path analyzer 118, may determine, or otherwise identify, available paths that may be used to transmit data between one of the OSPs 104 (via one or more DCs) and the end users 106 (via the computing devices 108). The path analyzer 118 may leverage various routing tables to determine possible paths, and then test the paths to determine whether they are viable paths for transmitting the data.

At 204, the TE server 110, via the measurement module 120, may measure costs and performance characteristics for each available path between one of the OSPs 104 and the end user 106 or a destination prefix. As discussed herein, performance is correlated with latency. For example, improved performance may be achieved by reducing latency. The cost may be a fee (dollar amount) to transmit data, which is charged by an ISP. The performance may be a RTT of a data transfer along the path. In some embodiments, the destination prefix may be a routing point where no alternative paths exist between the destination prefix and the end user 106. In some instances, the destination prefix is a small router destination that services a relatively small number of end users. Thus, the destination prefix may be used synonymously with "end user."

At 206, the TE server 110, via the optimization module 122, may perform an optimization to identify one or more optimized paths for transmitting data between one of the OSPs 104 and the end user 106. For example, the optimization module 122 may plot available paths based on cost and latency to determine optimal paths for various cost and latency values.

At 208, the TE server 110, via the traffic manager 116, may route traffic based on an optimized path as determined from the operation 206. For example, the routing tables may be modified to direct data requests (traffic) along one or more paths that are identified as the most efficient (via a balance of cost and performance (latency)).

Figure 3:
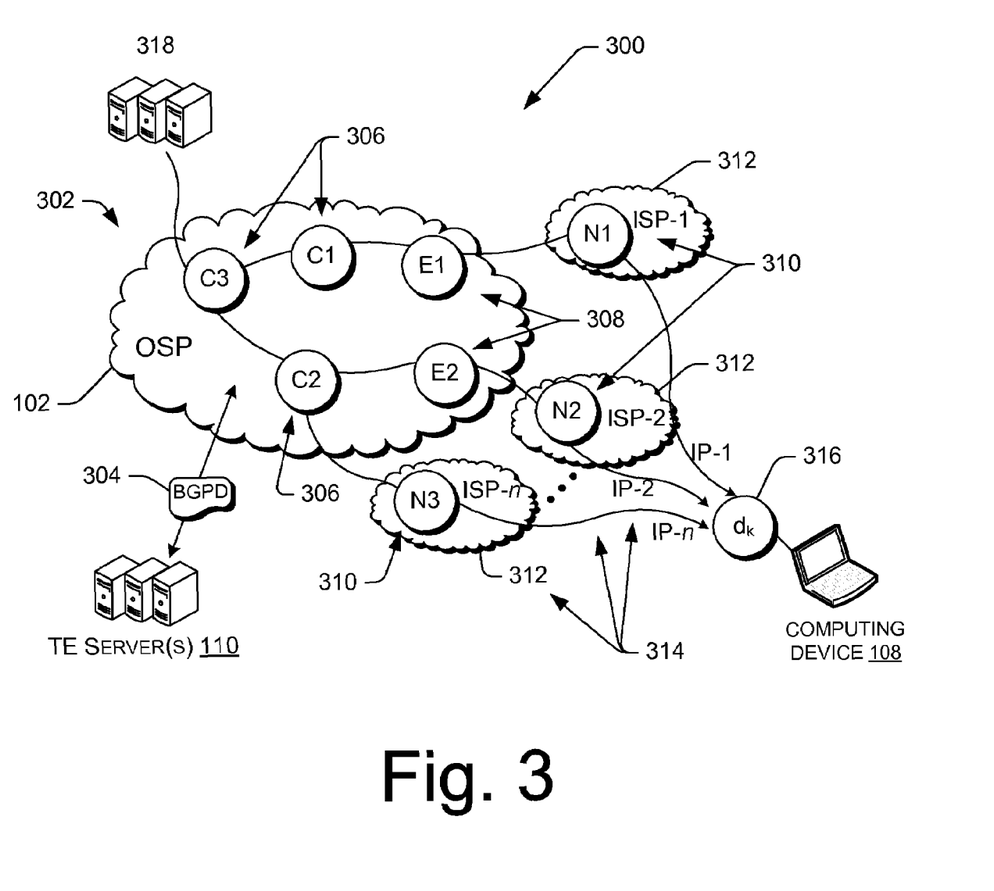
FIG. 3 is a schematic diagram of illustrative network paths between the client device and the OSP.

FIG. 3 is a schematic diagram of illustrative network paths 300 between the client devices 108 and the OSPs 104. The TE server 110 may be used to measure in real time, or near-real time, the performance and cost of routing traffic in a GFS network to a destination via any one of many alternative paths. However, the measurement may be conducted by the TE server 110 without actually redirecting the current ongoing traffic to that destination to that alternative path.

Measurement of a GFS network 302 may be performed by initially determining a default path and then determining alternative paths for each prefix in the GFS network 302. In some embodiments, one or more border gateway protocols (BGP) daemons 304 are set up on the TE server 110 to peer with core routers 306 and edge routers 308, where one BGPD is used per each autonomous system (AS). From peering BGP sessions, the TE server 110 extracts default BGP paths from DCs to each destination prefix (e.g., the end user 106, destination prefix). In addition, full routing tables from the edge routers 308 are periodically copied (e.g., dumped) by the TE server 110. From these routing tables, the TE server 110 can extract an Internet protocol (IP) address of a next hop 310 (i.e., an ingress router of a neighbor ISP 312) and an AS path 314 of each alternate path to a destination prefix 316 (a prefix) from the edge router 308. Thus, the TE server 110 may identify each available alternate path from a DC 318 (of the OSPs 104) to the destination prefix 316 of an end user 106, denoted as Path (DC, egress, next hop), where egress is the edge router 308, and the next hop 310 is a router of the neighbor ISP 312 that is willing to forward traffic from egress to the destination prefix 316 (effectively the end user).

Once all the alternate paths for a given destination prefix 316 are identified, the TE server 110 may measure a RTT for data transfer to each alternative path. In some embodiments, the TE server 110 may inject prefixes (or subprefixes) of the destination prefix 316 with alternate paths into the network to enable measurement of a performance (RTT) of these alternate paths by sending probes destined to the prefixes. Because BGP uses longest prefix matching, the ongoing traffic destined to those prefixes may be affected, i.e., diverted to the injected paths. To minimize the affected traffic, the TE server 110 may inject /32 prefixes, each of which will affect a single IP.

The above described injection process may be further explained by the following example. In the figure above, suppose two alternative paths between the DC 318 to the destination prefix 316 exist and a default path is Path(DC,E1, N1), where E and N denote the edge router 308 and the next hop router 310, respectively. The TE server selects one /32 subprefix IP-2 from p, and then performs the following: (1) injects (IP-2:nexthop=E2) into all the core routers C1, C2, and C3, and then (2) inject (IP-2:nexthop=N2) into E2.

Because BGP uses longest prefix matching in route selection, the traffic to IP-2 will follow Path(DC,E2,N2) while traffic to other IP addresses in p, e.g., IP-1, will still follow the default path. In general, the traffic manager 116 can inject multiple /32 prefixes and measure the RTTs of all the injected alternate paths and the default path simultaneously by probing IP-1 and all the injected IP addresses from DC at substantially the same time. To measure a given number of alternate paths (including the default one) to the destination prefix 316, the TE server 110 may inject (n) /32 prefixes into each of the core routers 306 and 1 /32 prefix into each egress edge router 308.

Figure 4:
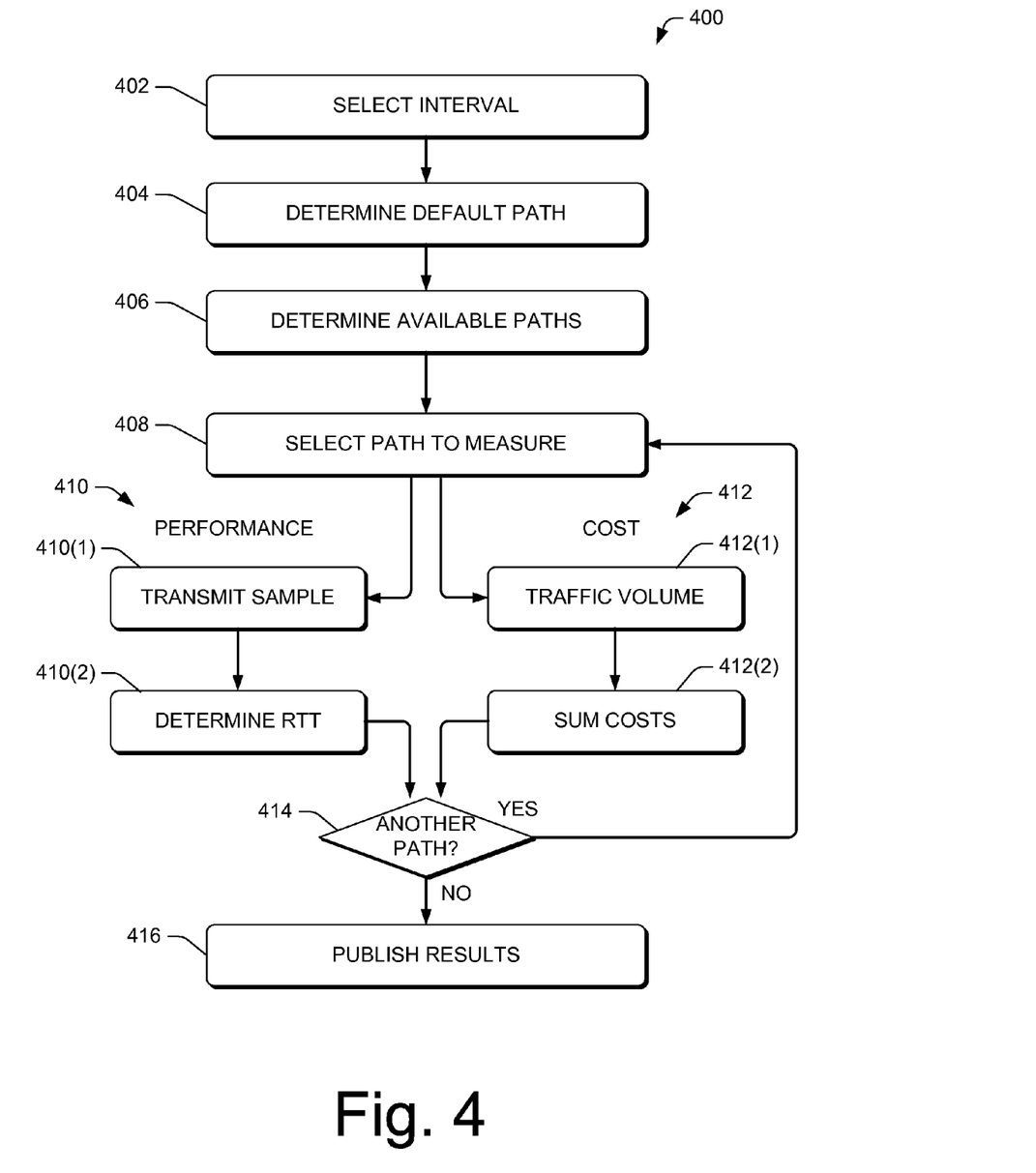
FIG. 4 is a flow diagram of an illustrative process of measuring costs and performance of various paths between the OSP and the end user.

FIG. 4 is a flow diagram of an illustrative process 400 of measuring costs and performance of various paths between one of the OSPs 104 and the end user 106 (or the destination prefix 316). The TE server 110, and more specifically the path analyzer 118 and the measurement module 120 of the traffic manager 116 may perform some or all of the operations of the process 400.

At 402, the measurement module 120 may select an interval to perform a measurement of a network, or portion thereof. For example, the measurement module 120 may measure cost and latency of the BGP network at intervals such as (and without limitation) daily, weekly, hourly, or more or less frequently. The interval may be implemented using a fixed or random schedule.

At 404, the path analyzer 118 may determine the default path by referencing a routing table from the edge router 308, or other routing location.

At 406, the path analyzer 118 may determine available paths between one of the OSPs 104 and the end user 106 (or the destination prefix 316). Again, the path analyzer may extract this information from a router table.

At 408, the traffic manager 116 may select a path for a measurement. In some embodiments, each of the available paths may be measured via a loop which begins at the operation 408.

At 410, the measurement module 120 may measure performance (or latency) of the path. The performance may be measured as the RTT. The RTT may be conducted via dataplane probing. The measurements can then be used to compute the aggregate performance of a given path strategy. In some embodiments, at 410(1), the measurement module 120 may send a Transmission Control Protocol acknowledgement (TCP ACK) packet to a random high port of an IP address of the end user (in the destination prefix 316). This may trigger the destination to return a TCP reset (RST) packet, which can be used to measure the RTT at 410(2). Although an alternative way to measure the RTT is by an Internet Control Message Protocol (ICMP) echo/reply, the RTT measured by TCP ACK/RST may be more accurate to the latency experienced by applications because most OSP applications are TCP-based and ICMP packets may be forwarded in the network using a lower priority setting.

In some instances, a randomly selected IP address in a prefix may not respond to a probe from the traffic manager 116. In such instances, the traffic manager 116 may use known techniques that prioritize and order probes to a small subset of IP addresses in a prefix that are likely to respond rather than scanning all the IP addresses or only checking the first IP address in a prefix.

At 412, the measurement module 120 may measure a cost (fee) associated with transmitting data across the path. One challenge in optimizing traffic cost is that the actual traffic cost is calculated based on a P95 link utilization over a certain billing period (e.g., a month) while an online TE strategy usually performs optimization for a short internal (e.g., scale of a seconds, minutes, etc), at a time. In one or more embodiments, the TE server 110 may use a greedy algorithm to optimize a short-term cost as a meaningful way to compare alternative strategies under a same traffic demand during a predetermined period of time.

At 412(1), the measurement module 120 may estimate traffic volume. The TE server 110 may have to estimate the traffic volume to each end user (prefix) because external links are charged by traffic volume to create a cost. The measurement module 120 may estimate traffic volume over a short interval (e.g., seconds, minutes, etc.) by collecting a net flow of data from all the core routers in the network because the data requests (traffic) flows to/from the DCs will traverse at least one core router. Thus, the traffic may be estimated by tallying the net flow.

At 412(2), the measurement module 120 may compute the traffic cost. For each link, the measurement module 120 may aggregate the traffic volume to all prefixes that traverse that link in a TE strategy. The total traffic cost is the sum of the cost incurred on all the links.

At 414, the measurement module 120 may determine whether another path needs to be measured to determine one of the latency or the cost. When another path is to be measured, the process 400 may loop back to the operation 408 where another path may be measured by the measurement module.

At 416, the measurement module may publish results when all of the paths have been measured via the loop between the operation 408 and 412. Typically, the results are published for each interval of the process 400, as determined by the operation 402. The published results are used by the optimization module 122 as discussed below.

Figure 5:
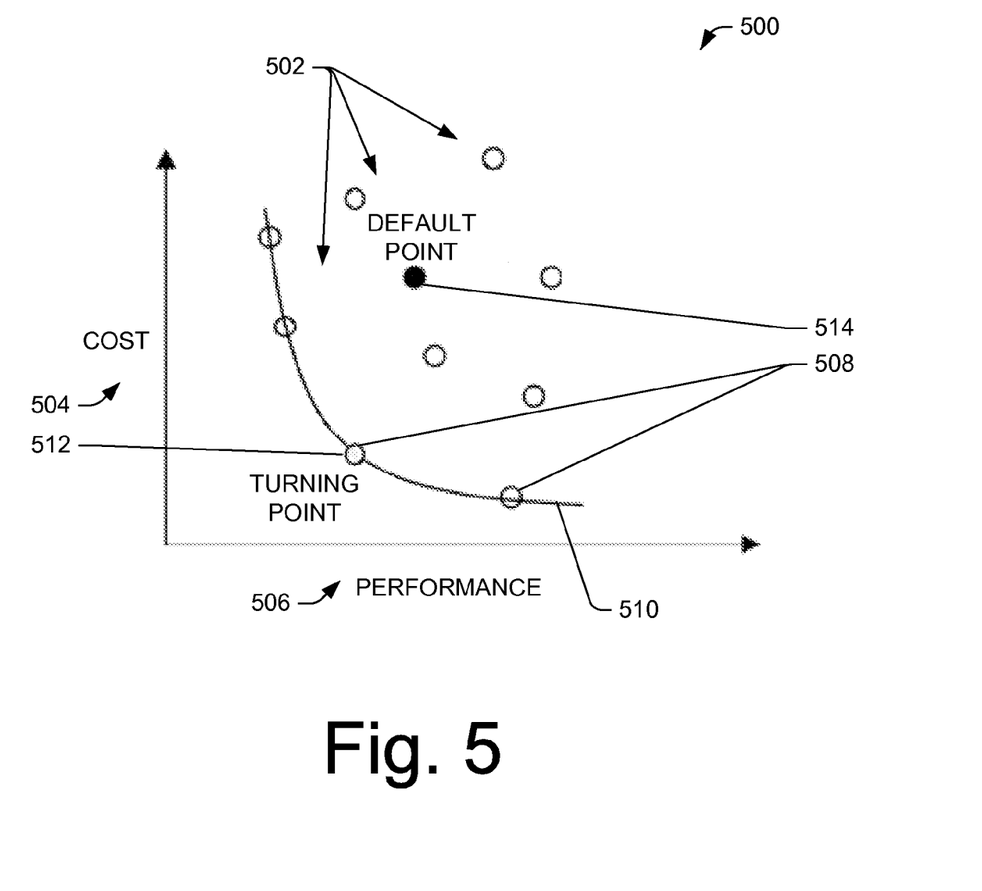
FIG. 5 is a chart showing illustrative cost and latency for various paths between the OSP and the end user.

FIG. 5 is a chart 500 showing illustrative cost and latency for various paths between the OSP and the end user. The chart 500 shows an optimization data points for each prefix, which may service multiple end users. Because a network may use many alternative routes to transmit data between a DC and the prefix, the chart 500 includes many data points 502, which are plotted with respect to cost 504 and performance 506 in RRT. The chart 500 may be used to create an assignment for each DC to a prefix via a path (e.g., Path(DC, C3, E2, N2) of FIG. 3, etc.). Each assignment, if deployed, may result in a certain level of aggregate application performance (latency) and incur a certain amount of traffic costs. The goal of the assignment is to select a path that conforms to a strategy of minimizing traffic costs and latency (increasing performance).

The path performance and traffic demands may evolve over time in the network, thus the assignments may be continually adapted in order to optimize performance and cost in the long term. In practice, online traffic engineering works by dividing the time into fixed time intervals, and at the end of each interval calculating an optimal assignment for routing the application traffic in the next interval. The interval may be the same as the interval selected at 402 in the process 400.

The data points 502 may be plotted from the published results at the operation 416, which include latency information from the operation 410 and cost information from the operation 412. In the chart 500, each data point represents a path assignment and possible strategy for routing traffic. However, not all strategies are worth exploring because some are not competitive in cost/latency when compared to other available strategies represented by the data points 502. As shown in the chart 500, only the optimized data points 508 that form the lower-left boundary, and thus an optimization curve 510 of all data points need to be considered because these optimized data points include either lower cost or lower latency than similarly situated data points. A strategy is considered optimal if there is no other strategy that has both lower latency and lower cost for a given cost value. Effectively, the lower-left boundary connecting all the optimal strategies forms the optimization curve on the plane.

In addition to identifying the optimization curve 510 formed by the optimized data points 508, the chart 500 may also enable identification of a turning point 512. When the data points are traversed along the optimization curve 510 from low latency to high latency, a small increase in RTT (from the minimum RTT) results in an initial sharp drop in the cost. After a certain point, defined as the turning point 512, a small reduction in cost results in sharp increase in latency. This location may indicate that a preferred strategy, depending on predefined preferences, should be selected near the turning point on the optimization curve 510. This strategy may be defined as a BalanceCostPerf strategy. Alternative strategies may see a minimized cost (e.g., LowestCost strategy), seek a minimized round trip time (e.g., LowestLatency strategy), or weigh cost and latency to determine a strategy between these two extremes.

As a reference point, the chart 500 may include a default point 514 that represents the cost and latency of a default path prior to a new path selection based on a path corresponding to the optimized data points 508 that are located along the optimization curve 510.

Figure 6:
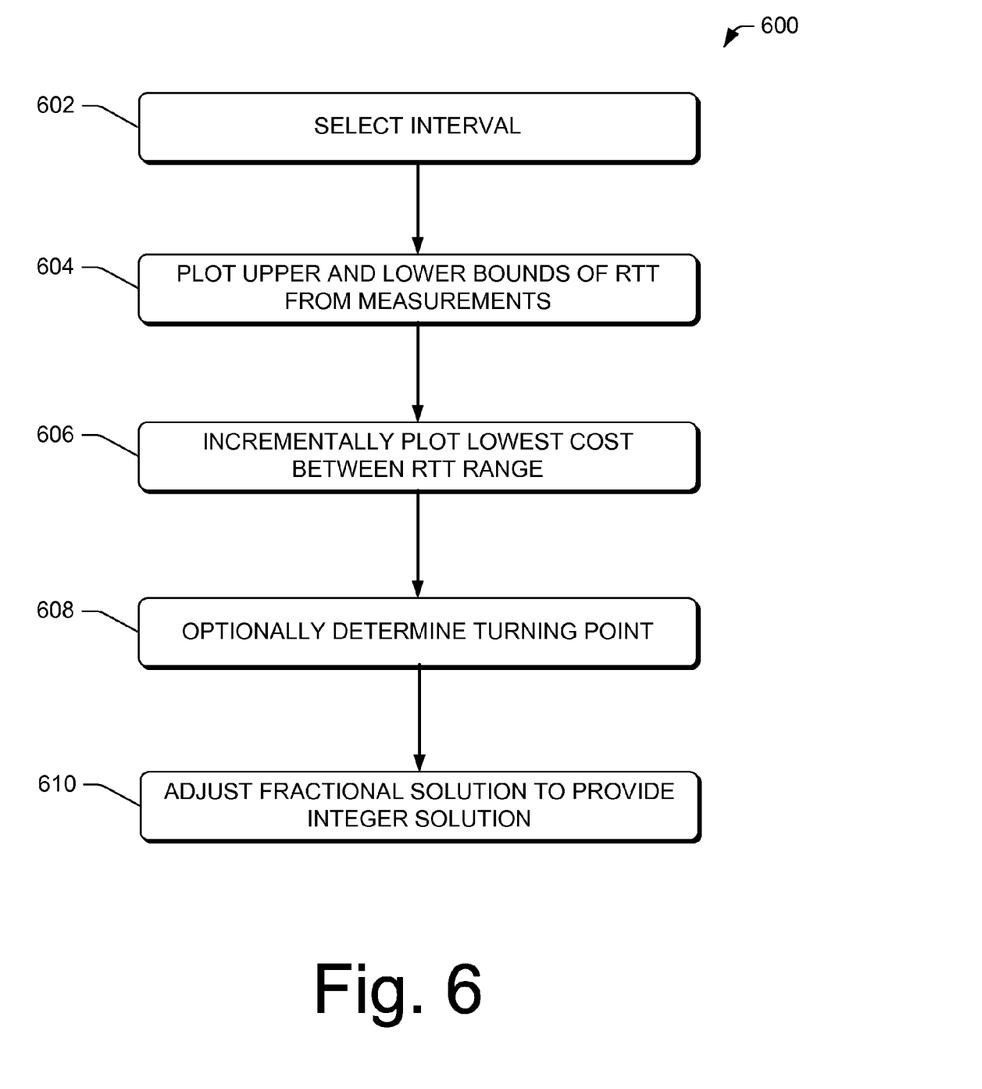
FIG. 6 is a flow diagram of an illustrative process of optimizing cost and performance to select a path between the OSP and the end user.

FIG. 6 is a flow diagram of an illustrative process 600 of optimizing cost and performance to select a path between the OSP and the end user (or the destination prefix). The process 600 will be described with reference to the chart 500 of FIG. 5. The TE server 110, and more specifically the optimization module 122 of the traffic manager 116, may perform some or all of the operations of the process 600.

At 602, the traffic manager 116 may select an interval to perform an optimization. The interval may be similar or identical to the interval selection at the operation 402 of the process 400.

At 604, the optimization module 122 may locate a range R of RTTs for any strategy on the optimization curve 510. At least two hypothetical strategies may be used to find the minimum and maximum RTT within R. A first strategy, e.g., HyperBestPerf, may be used whereby traffic to each destination is assigned to an alternative path with the lowest RTT. A second strategy, e.g., HyperLowestCost, may be used whereby the traffic to each destination is assigned to an alternative path with the lowest cost. In some embodiments, the optimization module 122 may ignore the link capacity constraint in an assignment process, and hence the two strategies may only be theoretical (not capable of actual implementation for assignment of a path). However, the first and second strategies provide reasonable lower and upper bounds of R.

At 606, the optimization module 122 may iteratively "sweep" between the minimum RTT to the maximum RTT within R with reasonably small increments (e.g., a few milliseconds, etc.) and find the corresponding optimized data point 508 at each increment. A connection of the optimized data points 508 with line segments approximates the optimization curve 510. Given a RTT within R, the optimization module 122 can compute the cost of a corresponding optimal strategy on the curve, which may be solved as a linear programming problem. Let $f_{kij}$ be the fraction of traffic to a destination ($d_k$) that traverse path($dc_i$, $link_j$) and $rtt_{kij}$ be the RTT to $d_k$ via path($d_i$, $link_j$). The problem can be described by equation 1 as follows.

$$\min \text{cost} = \Sigma_j \text{price}_j \times \Sigma_k \Sigma_i (f_{kij} \times \text{vol}_k)) \qquad \text{Equ. 1}$$

Equation 2 represents the capacity constraint for each link and μ is a constant (<1) that reserves some spare capacity to accommodate potential traffic variations as follows.

$$\Sigma_k \Sigma_i (f_{kij} \times \text{vol}_k) \leq \mu \times \text{cap}_j \qquad \text{Equ. 2}$$

Equation 3 represents the RTT constraint as follows.

$$\Sigma_k \Sigma_i \Sigma_j (f_{kij} \times \text{vol}_k \times \text{rtt}_{kij}) \leq \Sigma_k \text{vol}_k \times w\text{RTT} \qquad \text{Equ. 3}$$

Equation 4 ensures all the traffic to a destination must be successfully carried as follows.

$$\Sigma_i \Sigma_j f_{kij} = 1 \qquad \text{Equ. 4}$$

The objective is to find an appropriate set of variables $f_{kij}$ to minimize the total cost.

At 608, the optimization module 122 may optionally determine the turning point 512. The turning point may be selected at a point along the optimization curve 510 at which the incremental decrease in cost becomes negligible and the increasing latency becomes substantial, such that the optimization curve (when traced from the left with a low RTT) exhibits an apparent "turn" or corner. The turning point may be selected by an algorithm or a human and may be tailored based on preferred cost or latency requirements. However, this is just one possible solution of many for an optimal path.

At 610, the optimization module 122 may adjust (shift) the optimization curve, which is a fractional solution, to accommodate an integer solution, which enables a single path to accommodate all of the predicted traffic along a selected path. This adjustment is explained more fully below.

Integer Solution

As described above, the chart 500 shows fractional solutions to optimal BalanceCostPerf strategies using linear programming. In practice, the traffic to a destination prefix may be required or desired to flow along a single path at a time, and hence variables fkij must be either 0 or 1. This is referred herein as an integer solution. In order to convert the chart 500 from a fractional solution that is represented by the optimization curve 510, the traffic manager 116 may use a heuristic to convert the fractional solution to an optimal strategy with an integer solution.

The heuristic may use the fractional solution as a starting point to find the integer solution. A heuristic starts with the fractional solution and then sorts all of the destination prefixes ($d_k$) in the ascending order based on Equation 5.

$$avail_k = \sum_j \frac{availCap_j(d_k)}{vol_k} \quad \text{Equ. 5}$$

where $vol_k$ and $availCap_j(d_k)$ denote the traffic volume to dk and the available capacity at $link_j$ for carrying traffic to $d_k$, respectively. $AvailCap_j(d_k)$ is zero if $link_j$ cannot route traffic to $d_k$. The optimization module 122 then assigns the prefixes to links in a sorted order. In this way, it provides high priority to prefixes with large traffic volume and small available capacity. Given a destination $d_k$ and its corresponding $f_{kij}$'s in the fractional solution, the optimization module 122 randomly assigns all the traffic to $d_k$ to one of the paths path($dc_i$, $link_j$) that has enough residual capacity for $d_k$ with a probability proportional to $f_{kij}$.

Another version of the heuristic runs linear programming in a recursive manner. After assigning a prefix, the optimization module 122 updates the capacity constraint 1 and the RTT constraint 2 by removing that prefix from the linear programming, and re-computes all the fkij's for the remaining prefixes in a new linear programming. The optimization module 122 then assigns the next prefix by repeating the simple heuristic above (but again assigning only one prefix). This may help to prevent the final integer solution from deviating too far away from the original fraction solution. The heuristic then continues to a next iteration. This refined version, however, may be more costly than a simple version that is described above.

CONCLUSION

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method of routing traffic between an online service provider (OSP) and a destination prefix, the method comprising:

identifying a default source site and path between the OSP and the destination prefix;

identifying a plurality of available source sites and paths between the OSP and the destination prefix;

measuring a cost and a performance value for each of the plurality of available source sites and paths, the measuring the performance value including measuring a round trip time (RTT), loss rate, and available bandwidth using data-plane probing, the measuring the RTT including:

sending a Transmission Control Protocol acknowledgement (TCP ACK) packet to a random high port of an IP address of the destination prefix at a first time, and receiving a TCP reset (RST) packet at a second time, the RTT being the difference between the second time and the first time; and selecting one of the available source sites and paths as a preferred source site and path that has a lowest cost for an instance of the performance value when compared to the default source site and path and other source sites and paths of the plurality of available source sites and paths.

2. The method as recited in claim 1, wherein the measuring the cost includes:

measuring a traffic volume for a predetermined period of time across links and routers for each of the plurality of the available source sites and paths, and summing costs of the links and routers using the measured traffic volume to determine a cost per data transmission for each of the plurality of the available source sites and paths.

3. The method as recited in claim 1, wherein the selecting the preferred source site and path further includes:

plotting upper and lower bounds of the performance from measurements of the performance value to generate a performance range, and incrementally plotting a lowest cost between each incremental performance value in the performance range to generate a fractional optimization curve.

4. The method as recited in claim 3, wherein the preferred source site and path is selected at a turning point identified along the fractional optimization curve.

5. The method as recited in claim 3, wherein the selecting the preferred source site and path further includes determining an integer optimization curve based on the fractional optimization curve by selecting data points representative of available source sites and paths that have a residual capacity to support an estimated data transmission volume, and wherein preferred source site and path is selected as one of the available source sites and paths represented on the integer optimization curve.

6. The method as recited in claim 1, further comprising rewriting a routing table to implement the preferred source site and path as the default source site and path between the OSP and the destination prefix.

7. The method as recited in claim 6, wherein the rewriting a routing table occurs at a predetermined interval.

8. A computer memory storing computer-executable instructions that, when executed on one or more processors, causes the one or more processors to perform acts comprising:

identifying a plurality of available source sites and paths between an online service provider (OSP) and a destination prefix;

measuring a cost for each of the plurality of available source sites and paths;

measuring a performance value for each of the plurality of available source sites and paths; and selecting, from an optimization curve, one of the available source sites and paths as a preferred source site and path that has a lowest cost when compared to other source sites and paths of the plurality of available source sites and paths, the optimization curve being determined from lowest combinations of performance and cost for a range of performance values.

9. The computer memory as recited in claim 8, wherein the optimization curve is determined by:
   determining upper and lower bounds of the performance from measurements of the performance value to generate a performance range, and
   plotting incrementally a lowest cost between each incremental performance value in the performance range to generate a fractional optimization curve.

10. The computer memory as recited in claim 8, wherein the cost is measured by sampling traffic volume over a predetermined period and the performance value is determined by measuring at least one of a round trip time (RTT), loss rate, or throughput of data transfer between the OSP and the destination prefix.

11. The computer memory as recited in claim 8, wherein the acts further comprise rewriting a routing table to implement the preferred source site and path as the default source site and path between the OSP and the destination prefix at a predetermined interval.

12. A system, comprising:
   one or more processors; and
   memory to store instructions executable by the one or more processors, the instructions operable to:
      determine a plurality of available source sites and paths between an online service provider (OSP) and the destination prefix that is different from a default source site and path;
      measure a cost and performance value of each of the available source sites and paths and the default source site and path; and
      select, by generating an optimization curve, one of the available source sites and paths as a preferred source site and path when the one of the available source sites and paths has a lower cost or better performance value than the default source site and path, the generating the optimization curve being based on a lowest value of cost for a performance value, the one of the plurality of available source sites and paths being presented on the optimization value.

13. The system as recited in claim 12, wherein the measure of the performance value includes at least one of a measure of a round trip time (RTT), loss rate, or throughput using dataplane probing.

14. The system as recited in claim 12, wherein the cost is measured by instructions that are operable to:
   measure a traffic volume for a predetermined period of time across links and routers for each of the plurality of the available source sites and paths, and
   aggregate costs for the links and routers using the measured traffic volume to determine a cost per data transmission for each of the plurality of the available source sites and paths.

15. The system as recited in claim 12, wherein the instructions are further operable to rewrite a routing table and Domain Name System (DNS) mapping to implement the preferred source site and path as the default source site and path between the OSP and the destination prefix.

* * * * *